(12) United States Patent
Takehisa

(10) Patent No.: US 9,142,934 B2
(45) Date of Patent: Sep. 22, 2015

(54) OXYGEN LASER OSCILLATOR

(71) Applicant: Kiwamu Takehisa, Kawasaki (JP)

(72) Inventor: Kiwamu Takehisa, Kawasaki (JP)

( * ) Notice: Subject to any disclaimer, the term of this patent is extended or adjusted under 35 U.S.C. 154(b) by 42 days.

(21) Appl. No.: 14/237,006

(22) PCT Filed: Oct. 21, 2013

(86) PCT No.: PCT/JP2013/006205
§ 371 (c)(1),
(2) Date: Feb. 4, 2014

(87) PCT Pub. No.: WO2015/059731
PCT Pub. Date: Apr. 30, 2015

(65) Prior Publication Data
US 2015/0171591 A1    Jun. 18, 2015

(51) Int. Cl.
*H01S 3/22*    (2006.01)
*H01S 3/123*    (2006.01)
*H01S 3/104*    (2006.01)
*H01S 3/08*    (2006.01)
(Continued)

(52) U.S. Cl.
CPC ............ *H01S 3/123* (2013.01); *H01S 3/034* (2013.01); *H01S 3/081* (2013.01); *H01S 3/0815* (2013.01); *H01S 3/0816* (2013.01); *H01S 3/0817* (2013.01); *H01S 3/0818* (2013.01); *H01S 3/08059* (2013.01); *H01S 3/097* (2013.01); *H01S 3/104* (2013.01); *H01S 3/134* (2013.01); *H01S 3/22* (2013.01)

(58) Field of Classification Search
CPC ......... H01S 3/22; H01S 3/081; H01S 3/0815; H01S 3/0816; H01S 3/0817; H01S 3/0818; H01S 3/097; H01S 3/104; H01S 3/134
USPC ........................................ 372/55, 99, 103, 98
See application file for complete search history.

(56) References Cited

U.S. PATENT DOCUMENTS 6,553,054 B1 *   4/2003   Bauer et al. .................. 372/98
2013/0215925 A1 *   8/2013   Kaster et al. ................. 372/98

FOREIGN PATENT DOCUMENTS

JP    2007-235063 A    9/2007

OTHER PUBLICATIONS

Stephen C. Hurlick, et al., "Coil technology development at Boeing" Proceedings of SPIE vol. 4631, pp. 101-115, 2002.
(Continued)

*Primary Examiner* — Kinam Park
(74) *Attorney, Agent, or Firm* — Rothwell, Figg, Ernst & Manbeck, P.C.

(57) ABSTRACT

The disclosed invention relates to a method of realizing an oxygen laser oscillator. The laser oscillator relating to one aspect of the invention is provided with a laser cavity consisting of a high-reflectivity mirror (108) and a partial-reflectivity output mirror (107), a singlet oxygen generator (105), a focusing optics (109), and a shutter (113). Singlet oxygen ($O_2(^1\Delta_g)$) is supplied to the chamber (102A) which is pumped beforehand by a vacuum pump. In order to produce a laser oscillation, the shutter (113) is pulled out so that the radiation from $O_2(^1\Delta_g)$ goes back and forth inside the laser cavity. This causes a stimulated emission from $O_2(^1\Delta_g)$, and a pulsed laser is extracted from the output mirror (107).

10 Claims, 14 Drawing Sheets

(51) Int. Cl.
  H01S 3/034 (2006.01)
  H01S 3/097 (2006.01)
  H01S 3/134 (2006.01)
  H01S 3/081 (2006.01)

(56) References Cited

OTHER PUBLICATIONS

Masamori Endo, "History of COIL development in Japan: 1982-2002" Proceedings of SPIE vol. 4631, pp. 116-127, 2002.
Edward A. Duff and Keith A. Truesdell, "Chemical oxygen iodine laser (COIL) technology and development" Proceedings of SPIE vol. 5414, pp. 52-68, 2004.
Jarmila Kodymova "COIL—Chemical Oxygen Iodine Laser: advances in development and applications" Proceedings of SPIE vol. 5958, p. 595818, 2005.
Hironari Miyajima "Investigation of a laser oscillator development based on singlet excited oxygen" The Faculty of Science and Engineering, Keio University, 1986.
Otomar Spalek, et al., "Attempt to verify experimental Einstin A-coefficient used for $O_2(1\Delta g)$ determination in COIL" Proceedings of SPIE vol. 3574, pp. 550-559, 1998.
E. E. Whiting, "Attempt to verify experimentally Einstein A-coefficient used for $O_2(1\Delta g)$ determination in COIL" J. Quant. Spectrosc. Radiat. Transfer, vol. 8, pp. 1379-1384, 1968.
Azyazov, V. N., Nikolaev, V.D., Svistun, M.I. and Ufimtsev, N.I., "An Empirical Approximation to the Voigt Profile", Quantum Electron., vol. 29, No. 9, pp. 767-771, 1999.
Ales Bizjak, et al., "Rotating-Mirror Q-Switched Er:YAG Laser for Optodynamic Studies" Journal of Mechanical Engineering, vol. 57, pp. 3-10 (2011).
J. H. Van Vleck, "Magnetic dipole radiation and the atmospheric absorption bands of oxygen" The Astrophysical Journal, vol. 80, No. 3, pp. 161-170, 1934.

* cited by examiner

TABLE1

· LASER EMISSION $O_2(^1\Delta_g) \longrightarrow O_2(^3\Sigma_g^-) + h\nu$  $\quad k_1 = 2.31E-4$ · $O_2(^1\Delta_g)$ FORMATIONS $O_2(^1\Sigma_g^+) + O_2(^3\Sigma_g^-) \longrightarrow O_2(^3\Sigma_g^-) + O_2(^1\Delta_g)$  $\quad k_2 = 4.0E-17$ $O_2(^1\Sigma_g^+) + H_2O \longrightarrow O_2(^1\Delta_g) + H_2O$  $\quad k_3 = 4.5E-12$ · $O_2(^1\Delta_g)$ DEACTIVATIONS $O_2(^1\Delta_g) + O_2(^3\Sigma_g^-) \longrightarrow 2\,O_2(^3\Sigma_g^-)$  $\quad k_4 = 1.6E-18$ $O_2(^1\Delta_g) + O_2(^1\Delta_g) \longrightarrow 2\,O_2(^3\Sigma_g^-)$  $\quad k_5 = 5.5E-23$ $O_2(^1\Delta_g) + O_2(^1\Delta_g) \longrightarrow O_2(^1\Sigma_g^+) + O_2(^3\Sigma_g^-)$  $\quad k_6 = 2.0E-17$ $O_2(^1\Delta_g) + H_2O \longrightarrow O_2(^3\Sigma_g^-) + H_2O$  $\quad k_7 = 4.0E-18$

· OTHER TRANSITIONS $O_2(^1\Sigma_g^+) \longrightarrow O_2(^3\Sigma_g^-) + h\nu$  $\quad k_8 = 1.3E-25$ AN UNIT OF k1 IS [/s], UNITS OF k2 TO K8 ARE [cm3/s]

Fig. 10

TABLE 2

- TOTAL OXYGEN PRESSURE : 10Torr (1333Pa)
- $O_2(^1\Delta_g)$ YIELD: 60%
- OXYGEN GAS TEMPERATURE: 273.15K
- $H_2O$ PRESSURE: 4.6Torr (611Pa)

OXYGEN LASER OSCILLATOR

CROSS REFERENCE TO RELATED APPLICATION

This application is a 35 U.S.C. 371 National Phase Entry Application from PCT/JP2013/006205, filed Oct. 21, 2013, the disclosure of which is incorporated herein in its entirety by reference.

TECHNICAL FIELD

The present invention relates to an oxygen laser oscillator whose purpose is to give a direct laser oscillation from the excited oxygen molecule.

BACKGROUND ART

It is known that a singlet oxygen molecule is generated from the chemical reaction of chlorine gas with a mixed solution of hydrogen peroxide solution ($H_2O_2$) and potassium hydroxide (KOH) or sodium hydroxide (NaOH). A chemical oxygen iodine laser (generally called COIL, COIL being an abbreviation for Chemical Oxygen Iodine Laser) which operates as a laser by transferring energy of $O_2(^1\Delta_g)$ to an iodine atom (I) is commonly known as a high energy laser of 1.315 um. Non-Patent literature 1 to 4 explains about the chemical oxygen iodine laser.

One of the reasons for utilizing the energy transfer from the excited $O_2(^1\Delta_g)$ to iodine is that it is considered that direct lasing from $O_2(^1\Delta_g)$ is difficult. Actually, there has been no report concerning direct lasing from $O_2(^1\Delta_g)$. However, there is a report which says weak light was detected in an experiment which aims at the direct lasing of $O_2(^1\Delta_g)$. In the experiment, a spectrum observation was not performed. Non-Patent literature 5 is the only a report which says that the direct lasing from $O_2(^1\Delta_g)$ was successful. According to the Non-Patent literature 5, although the lasing of the oxide laser was confirmed, it was a small amount of energy. Since there has been no other report concerning the direct lasing of $O_2(^1\Delta_g)$, it has been considered that the realization of an oxygen laser is difficult. It is considered that one of the reasons for this is that the long spontaneous emission lifetime of $O_2(^1\Delta_g)$ makes the laser gain, which is inversely proportional to the spontaneous emission lifetime, quite small.

It has been reported that the spontaneous emission lifetime is approximately 72 mins. which is orders of magnitude longer than that of other lasers. For example, the spontaneous emission lifetime of the excited iodine is approximately 130 ms, which is shorter than that of $O_2(^1\Delta_g)$ by four digits. Also, YAG laser widely used as a solid laser has a spontaneous emission lifetime of approximately 230 µs (the radiation lifetime for the laser transition is approximately 550 µs), which is shorter than that of $O_2(^1\Delta_g)$ by seven digits. The spontaneous emission lifetime for $O_2(^1\Delta_g)$ is further described in a technical paper such as a paper of Non-Patent literature 6.

Meanwhile, the stimulate emission coefficient (B) which influences the easiness of lasing is expressed as the relation (1). Since the stimulate emission coefficient (B) is proportional to the spontaneous emission coefficient (A), which is the reciprocal of the spontaneous emission lifetime, the stimulate emission coefficient for $O_2(^1\Delta_g)$ becomes quite small. This results in a small gain.

[Equation 1]

$$A_{21}/B_{21} = 8\pi v_{21}^3 h/c^3 \quad (1)$$

Where h is the Plank constant, v21 is a frequency of the transition, and c is the speed of light.

However, the small gain does not mean that lasing is impossible, but simply means that lasing is difficult. Since a long gain length is considered to oscillate, simulations are performed to confirm this oscillation.

The simulations are based on rate equations which are typically used to estimate laser power. The utilized rate equations are listed in the table 1. A spectral profile g (v) shown in the following equation 2 is used for the simulations which consider both the Doppler broadening and the pressure broadening.

[Equation 2]

$$g(v) = 2\sqrt{\frac{\ln 2}{\pi}} \frac{V(a, x)}{\Delta v_D} \quad (2)$$

Where V (a, x) is the Voigt profile which can be calculated as the following equation (3). For example, the following Non-Patent literature 7 explains this point.

[Equation 3]

$$V(a, x) = \frac{a}{\pi} \int_{-\infty}^{\infty} \frac{e^{-y^2}}{a^2 + (x-y)^2} dy \quad (3)$$

Where a and x are variable numbers defined by the following equations (4) and (5).

[Equation 4]

$$a = \sqrt{\ln 2} \frac{\Delta v_c}{\Delta v_D} \quad (4)$$

[Equation 5]

$$x = 2\sqrt{\ln 2} \frac{(v - v_0)}{\Delta v_D} \quad (5)$$

A calculation result of the spectral profile factor g(v) is shown in FIG. 7 with the parameter of the O2 pressure. Since the profile has a curved shape against a frequency v, g (v) value depending on the divided frequency should be considered in the simulation in order to accurately estimate the laser output energy/power. However, to confirm whether lasing is possible, the peak value of the g (v) is used to save computation time.

When considering the laser oscillation of the oxide laser, vibrational levels and rotational levels for the oxygen molecule should be considered. According to Non-Patent literature 8, since most oxygen molecules populate the lowest vibrational level of V=1, the simulations consider the population distribution of only rotational levels to save computation time. The population density N (j) of each rotational level of oxygen molecules can be calculated by the following equation (6).

[Equation 6]

$$N(J) = N \frac{hcB_v}{k_B T}(2J+1)\exp\left[-\frac{E(J)}{k_B T}\right] \quad (6)$$

Where kB is a Boltzmann constant, and By is the rotational constant with the value of 42.5 GHz. The By is further explained in the following Non-Patent literature 8. N (J) becomes a carved line shown in FIG. 8 in the case of T=273 deg in the equation (6).

However, the population density N (J) illustrated in FIG. 8 is the sum of the population densities for the three branches which are classified in accordance with the difference between the J number of the upper level and that of the lower level. A branch is called an Q branch when J of the upper level is the same as that of the lower level (therefore $\Delta J=0$), a branch is called an P branch when J of the lower level is one greater than that of the upper level (therefore, $\Delta J=-1$), and a branch is called an R branch when J of the lower level is one smaller than that of the upper level (therefore, $\Delta J=+1$). The population in consideration of transition probabilities of the P, Q, and R branches is illustrated in FIG. 9. It should be noted that, among the three branches, the Q branch gives the strongest emission. Non-Patent literature 10 explains about the transition probability of each branch. The Non-Patent literature 1 reports a measurement result in which the spontaneous emission from the Q branch is the strongest one among the three branches.

Since the lasing starts at the transition from the level with the largest population, the peak value of the population curve is taken into the consideration in the simulation. Although it is considered that the laser transition can simultaneously occur at the several lines with their gains higher than the oscillation threshold, the simulation considers only the peak values of the Q branches.

A computer program of the simulation as explained above has been developed based on the rate equations in consideration of the reaction equations listed in the table 1 in FIG. 10. A space along the laser cavity is divided into a plurality of areas as shown in FIG. 11, and the population density and photon density for each level for each small area are used as variables in the rate equation. In the simulation of the laser cavity, two variables are used for the laser photons, one being for the photons travelling in one direction, the other being for the photons travelling in the opposite direction. However, the first variable is used for the laser amplifier simulation.

The conditions for calculating the simulations are listed in the table 2 in FIG. 12. An excited oxygen generation efficiency of 60% is assumed, considering typical singlet oxygen generators. This means 60% of generated oxygen molecules are assumed to be $O_2(^1\Delta_g)$, while 40% of the same are $O_2(3\Sigma g)$. A total oxygen pressure of 1000 Pa (~0.1 atm) is assumed considering some high pressure singlet oxygen generators. An oxygen temperature of 0 degrees C. (273.15K) is assumed. And the $H_2O$ pressure is assumed to be equal to the saturation vapor pressure at 0 degrees C.

The configuration of the oxygen molecule laser oscillator shown in FIG. 6 is simulated. A laser cavity 615 has an output mirror 607 and a total reflector 608. The output mirror 607 and the total reflector 608 are installed inside a housing 601. Before generating excited oxygen molecules in order to fill the inside of the laser cavity 615 with the excited oxygen molecules, the laser cavity 615 is evacuated (the pumping direction is expressed as an arrow 603). After the evacuation, a valve 604 is closed in order not to pump out the excited oxygen molecules and to fill the inside of the laser cavity 615 with the excited oxygen molecules.

Since it is necessary not to oscillate until the inside of the laser cavity 615 is filled with enough excited oxygen molecules, the total reflector 608 needs to be off-aligned so that the radiation generated inside the laser cavity 615 will not be resonated. Therefore the total reflector 608 is a rotating mirror which is rotated so that the total reflector 608 and the output mirror 607 become parallel only when the laser oscillates. That is, the total reflector 608 as the rotating mirror functions as a Q switch. Such a rotating-mirror Q switch is described in the following Non-Patent Literature 9.

At first, in order to estimate a minimum required length of the laser cavity, an $O2$ laser amplifier is simulated. The simulation results in a small-signal gain coefficient against a gain length of the amplifier are shown in FIG. 13. As illustrated in FIG. 13, a gain length of more than 7 m is necessary to obtain a gain of more than 1%.

Therefore, to be able to oscillate, the O2 laser oscillator is simulated, assuming a cavity length of 10 m, an output mirror reflectivity of 99.0% and a total reflector reflectivity of 99.9%. The simulation result is shown in FIG. 14. The horizontal axis denotes an elapsed time from a Q switched operation after filling the inside of the laser cavity with the excited oxygen molecules, and the vertical axis denotes time variation of the output laser power density. The result indicates that lasing can be possible with a pulse half width of 20-30 µs at the time of ~0.15 ms. Since the plotted output power density is only for a single rotational transition, a much larger amount of output energy can be expected considering all the possible laser transitions.

As mentioned above, the simulation shows the possibility of lasing by lengthening a gain length so that it is a long one of 10 m. To realize an actual device with such a long gain length, a large number of excited oxygen molecules are necessary, which might require a big high-flow-rate singlet oxygen generator. However, a big singlet oxygen generator is not necessarily required considering that the singlet oxygen has quite a long radiation lifetime, which allows sufficient time for generating enough singlet oxygen molecules. This is one of the advantages of oxygen molecule lasers.

CITATION LIST

Patent Literature

Patent Literature 1: Japanese Unexamined Patent Application Publication No. 2007-235063

Non Patent Literature

Non Patent Literature 1: Stephen C. Hurlick, et al., "COIL technology development at Boeing" Proceedings of SPIE Vol. 4631, pp. 101-115, 2002

Non Patent Literature 2: Masamori Endo, "History of COIL development in Japan: 1982-2002" Proceedings of SPIE Vol. 4631, pp. 116-127, 2002

Non Patent Literature 3: Edward A. Duff and Keith A. Truesdell, "Chemical oxygen iodine laser (COIL) technology and development" Proceedings of SPIE Vol. 5414, pp. 52-68, 2004

Non Patent Literature 4: Jarmila Kodymova "COIL—Chemical Oxygen Iodine Laser: advances in development and applications" Proceedings of SPIE Vol. 5958, p. 595818, 2005

Non Patent Literature 5: Hironari Miyajima "Investigation of a laser oscillator development based on singlet excited oxygen" The Faculty of Science and Engineering, Keio University, 1986

Non Patent Literature 6: Otomar Spalek, et al., "Attempt to verify experimental Einstin A-coefficient used for $O_2(^1\Delta_g)$ determination in COIL" Proceedings of SPIE Vol. 3574, pp. 550-559, 1998

Non Patent Literature 7: E. E. Whiting, J. Quant. Spectrosc. Radiat. Transfer, Vol. 8, pp. 1379-1384, 1968

Non Patent Literature 8: Azyazov, V. N., Nikolaev, V. D., Svistun, M. I. and Ufimtsev, N. I., Quantum Electron., Vol. 29, No. 9, pp. 767-771, 1999

Non Patent Literature 9: Ales Bizjak, et al., "Rotating-Mirror Q-Switched Er:YAG Laser for Optodynamic Studies" Journal of Mechanical Engineering, Vol. 57, pp. 3-10 (2011).

Non Patent Literature 10: J. H. Van Vleck, "Magnetic dipole radiation and the atmospheric absorption bands of oxygen" The Astrophysical Journal, Vol. 80, N. 3, pp. 161-170, 1934

SUMMARY OF INVENTION

Technical Problem

As mentioned above, the simulation shows the possibility of lasing. The simulation also shows that the pulse width becomes as short as around 30 µs, which is eight orders of magnitude smaller than the spontaneous emission lifetime of ~72 min Although this large difference is natural since it is attributed to the difference between spontaneous emission and stimulated emission, we found the following technical problems which have to be solved in order to achieve high efficient oscillation.

In the simulation, the lasing can start at the moment the Q switch is ON after storing a sufficient inversion population of the singlet oxygen molecules for the lasing. However, in an actual device, a fast Q switch with the rise up time of much less than 0.1 ms is necessary, since the lasing starts at around 0.15 ms after the start of the simulation (after the Q switch is ON).

In the case of a rotating mirror like the total reflector 608 shown in FIG. 6, Q switch becomes ON at the moment when the total reflector 608 and the output mirror 607 become completely parallel. If the total reflector 608 and/or the output mirror 607 is a concave mirror in order to increase the laser cavity stability, radiation resonance happens even if one of the mirrors tilts a little. Consequently laser can oscillate at high-order transverse modes, while it is difficult to oscillate it at a single transverse mode.

Additionally, the rotating-mirror Q switch can work only in the case of oscillating a short diameter beam. It is considered to be difficult, in terms of mechanics, to oscillate a large diameter beam with the rotating-mirror Q switch. Therefore it is considered that for a high power oscillation, the rotating-mirror Q switch is not appropriate.

Meanwhile, an accost optic Q switch (typically called an AO Q switch), which is placed in the laser cavity, is widely used for solid state lasers such as YAG lasers with near-infrared. It is well known that an AO Q switch operates in a short time, namely, on the order of a micro second. However, since the AO Q switch has an insertion loss of 5-10%, it is difficult to oscillate with the gain length of ~20 m, which can be predicted by the oxygen laser amplifier simulation shown in FIG. 13.

The present invention can solve the above mentioned problems, and can realize an oxygen laser oscillator which can generate a pulsed laser.

Solution to Problems

In order to solve the above mentioned problems and realize a highly efficient oxygen laser oscillator, the present invention employs any method of making a focused point inside the laser cavity, and also employs a shutter placed near the focused point in order to control whether laser light passes through or is blocked at the focused point. This enables the realization of a Q switch which has a very fast rise time because the laser spot diameter is very small at the focused point. Moreover, the shutter has no insertion loss, which can enable even a low gain oxygen laser oscillator to give a highly efficient laser oscillation.

In one embodiment of the present invention, a mechanical shutter, like the one used in a single-lens reflex camera, is used in which a metal plate can slide quickly due to the force of a spring. This is because the shutter needs to be OFF for a relatively long time (although it depends on the singlet oxygen generation rate, this time is typically several seconds) until a sufficient number of the singlet oxygen molecules are stored. Instead of being only a typical coil spring, the spring of the spring drive can also be a flat spring or an air spring. Such springs can move the shutter very quickly at a moment the switch becomes ON, since the spring applies force to the shutter during the OFF period.

On the other hand, in the case of utilizing a rotating disc like the one shown in Patent literature 1, the Q switch becomes ON once in a single rotation. Therefore, if the OFF time is set to be longer than 1 sec using the rotating disc (or a method called a rotating chopper), the rotation speed should be reduced. Consequently, the rise time of the Q switch becoming ON becomes longer. Therefore, the rotating disc Q switch is not appropriate for the present invention.

Meanwhile, in the oxygen laser oscillator of the present invention, peak power of the pulsed laser is considered to be very high since it can produce a short pulse width on the order of a microsecond. Consequently, there is a concern that plasma may be generated in the focused point if gas exists at the focused point.

Therefore another embodiment of the invention employs a mechanism which can pump out the area including the focused point. This prevents generating of plasma at the focus point even if a high intensity laser is focused at the focused point. Therefore, the oscillation is not stopped by plasma absorption.

In yet another embodiment of the invention, insulation gas such as sulfur hexafluoride ($SF_6$) is introduced into the area including the focused point. This also prevents generating of plasma at the focused point even if a high intensity laser is focused there.

Advantageous Effects of Invention

The present invention provides an oxygen laser oscillator which produces a pulsed laser.

BRIEF DESCRIPTION OF DRAWINGS

FIG. 10 is a table 1 showing each reaction equation and reaction rate constants;

DESCRIPTION OF EMBODIMENTS

Figure 1:
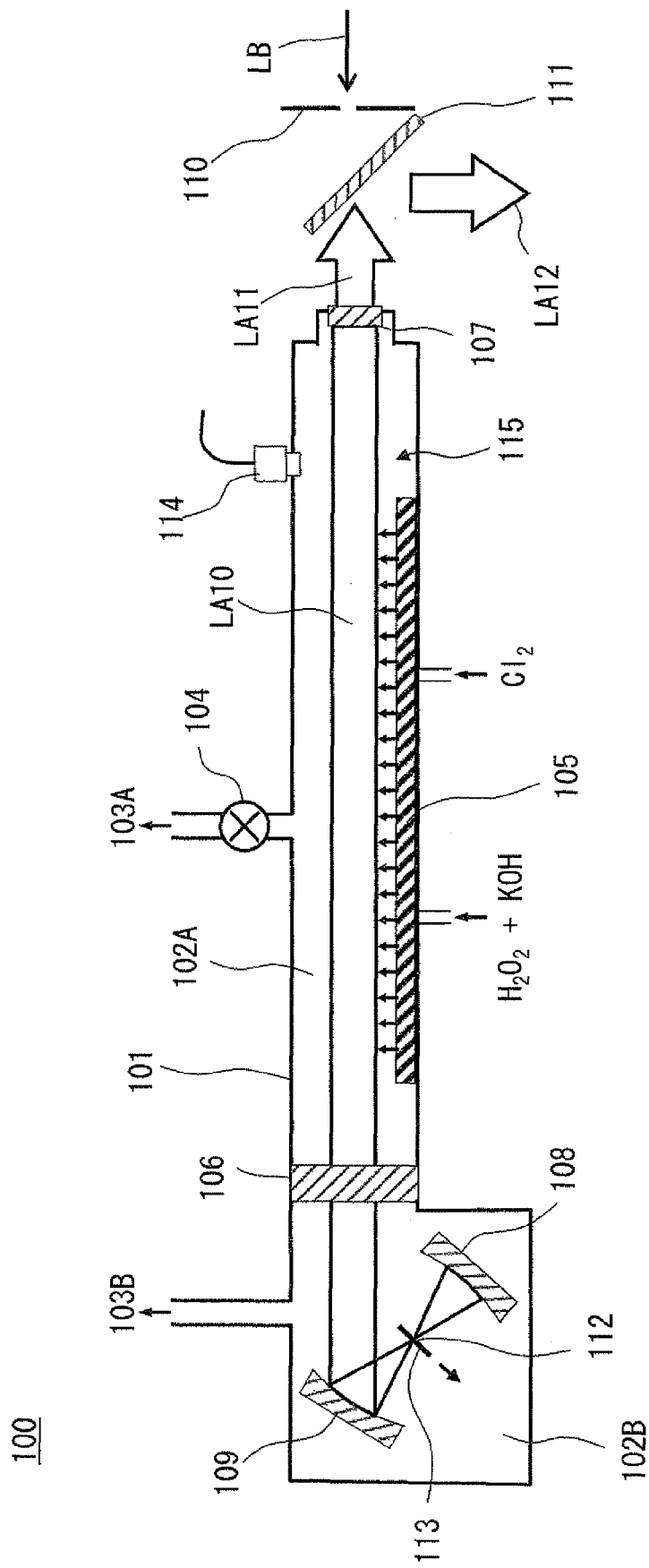
FIG. 1 is a cross sectional drawing of an oxygen laser oscillator 100 according to an embodiment of the invention.

Exemplary embodiments of the present invention are explained with reference to the attached drawings. The exemplary embodiments explained below are examples of the present invention, and the present invention is not limited to these exemplary embodiments. Note that components denoted by the same reference numerals in the specification and drawings indicate the same components.

First Embodiment

Hereinafter, the first embodiment according to the present invention is described based on FIG. 1. FIG. 1 is a cross-sectional configuration showing the oxygen laser oscillator according to the present invention. A singlet oxygen generator 105 is located under a housing 101 of the oxygen laser oscillator 100. The singlet oxygen generator generates excited oxygen molecules. The mixture solution (called BHP, which is an abbreviation of Basic Hydrogen Peroxide) of hydrogen peroxide solution ($H_2O_2$) and potassium hydroxide (KOH), and chlorine gas ($Cl_2$) are supplied into the singlet oxygen generator 105 where $O_2(^1\Delta_g)$ is generated by mixing BHP with $Cl_2$. The many arrows illustrated in the singlet oxygen generator 105 indicate the generated singlet oxygen molecules.

Any conventional method for mixing BHP and $Cl_2$ can be applied such as an aerosol system in which misty BHP and $Cl_2$ gas are mixed, and a wetted-wall system in which flowing membranous BHP contacts $Cl_2$ gas. But it is better to use a singlet oxygen generator which can generate a high $O_2(^1\Delta_g)$ yield. Such mixture methods are explained in a Non Patent literature 10.

The inside of the housing 101 is divided into two parts so that a chamber 102A and a chamber 102B are connected in series. The chambers 102A and 102B are independently kept in a vacuum by two vacuum pumps 103A and 103B (arrows only show vacuum pumping directions, while the vacuum pumps themselves are not illustrated). Between the chamber 102A and the chamber 102B, a quartz window 106 is placed to seal these two chambers 102A and 102B.

An output mirror 107 is attached in housing 101 on the chamber 102A side. The output mirror 107 is a partial transmittance mirror which has a high reflectivity of ~99.0% at a 1.27 μm wavelength. The output mirror 107 partially transmits light with a 1.27 μm wavelength. The output mirror 107 preferably has a high reflectivity higher than 99% at a 1.27 μm wavelength. A concave mirror 108 is attached as a total reflector in the chamber 102B. The concave mirror 108 constitutes a laser cavity 115. The concave mirror 108 preferably has a high reflectivity higher than 99.9% at a 1.27 μm wavelength. The reflectivity of the concave mirror 108 is higher than that of the output mirror 107 at a 1.27 μm wavelength. The laser cavity 115 includes the output mirror 107 and the concave mirror 108. A laser cavity length of longer than 20 m is desirable, and the drawing in FIG. 1 is not to scale.

A parabolic mirror 109 which functions to focus optics as one component of the present invention is placed inside the laser cavity. The parabolic mirror 109 makes a focused point 112 inside the laser cavity. A mechanical shutter 113 is placed near the focused point 112. Only a metal plate which constitutes the shutter 113 is illustrated in FIG. 1. The metal plate can be pulled into and be pulled out from the focused point 112. The focused point 112 means a point where a laser beam is focused when laser radiation is generated inside the laser cavity which is composed of the output mirror 107 and the concave mirror 108.

Before the laser operation, the two chambers 102A and 102B are pumped out in advance to the level of less than 0.1 Pa. After the pumping, a valve 104 on the chamber 102A is closed in order to align the laser cavity using a He—Ne laser (not shown) as explained later. During the alignment, the shutter 113 is pulled out from the focused point 112 so that the laser beam can pass through the focused point 112.

The 633 nm laser beam LB (hereinafter, a laser beam from the He—Ne laser is called LB) goes through a pinhole of a pinhole plate 110, and transmits the dichroic mirror 111. The laser beam LB which transmits the dichroic mirror 111— enters inside the laser cavity from the center of the concave mirror 107. One surface (left lower plane in FIG. 1) of the dichroic mirror 111 has an optical coating which has a transmittance of more than 90% at ~633 nm, while it has a reflectivity of more than 99% for near infrared at a 1.27 μm wavelength.

The laser beam LB which enters into the laser cavity goes through the window 106, and then is reflected by the parabolic mirror 109. The laser beam LB reflected by the parabolic mirror 109 is propagated as a focusing beam. Since the shutter 113 is pulled out from the focused point 112, the laser beam LB is focused at the focused point 112, and then the laser beam LB comes to the concave mirror 108 as a spreading beam. As a result, the concave mirror 108 reflects the laser beam LB in the opposite direction, and then the laser beam LB passes through the focused point 112. The parabolic mirror 109 reflects the laser beam LB and collimates the laser beam LB again. Then the collimated laser beam LB exits the laser cavity from the output mirror 107 and comes to the pinhole plate 110.

The concave mirror 108 and the parabolic mirror 109 are adjusted so that the beam center of laser beam LB which is exited from the output mirror 107 can hit the center of the pinhole of the pinhole plate 110. As described above, an alignment of the optical axis is completed. After the alignment of the optical axis, the shutter 113 is inserted into the focused point 112 in order to prevent the laser beam from going back and forth in the laser cavity. After that, the chamber 102A is filled with $O_2(^1\Delta_g)$ generated from the singlet oxygen generator 105. As described above, preparation of the lasing is completed.

In order to start lasing, the shutter 113 is pulled out from the focused point 112, which enables a generated laser beam LA10 to go back and forth inside the laser cavity. Consequently, a stimulated emission occurs, and lasing is started by amplified light in the laser cavity. The laser beam indicated as LA 11 is extracted to the outside from the output mirror 107. The laser beam LA11 is reflected by the dichroic mirror 111, and travels downward as laser beam LA12. Therefore the shutter 113 functions as a Q switch for the lasing.

As described above, a vertical travel metal focal plane shutter used in a single-lens reflex camera is desirable for the shutter 113 which has a Q switch function because it can be moved for several tens of millimeters in a time as short as 1 ms by a force of a strong spring. Since the beam diameter at the focus point 112 is about ten micron meters, the shutter 113 can be switched on in the order of micro second.

When lasing, the laser beam is focused at the focus point 112 in the laser cavity 115. Therefore, if the window 106 does not separate the chamber 102A from the chamber 102B, oxygen molecules come into the chamber 102B. This causes a possibility of oxygen plasma being generated by the focused laser beam. Since oxygen plasma absorbs the laser light, the lasing may stop.

As to this point, since the chamber 112B which includes the focused point 112 is kept vacuumed during the laser operation by the vacuum pump 103B, the plasma cannot be generated in the chamber 102B even though high energy laser beam is generated. Therefore, the plasma is not generated, and the lasing can occur. This is another feature of the present invention.

Alternatively, the chamber 102B may be filled with $SF_6$ gas at a gas pressure of 1 atm or more. $SF_6$ is a harmless gas and is known to have high insulation properties. Even though the high energy laser beam is focused at the focused point 112, a dielectric breakdown does not occur. Therefore, the plasma is not generated at the focused point 112. Instead of $SF_6$, high pressure nitrogen ($N_2$) gas can be used to suppress plasma generation. In this case, $N_2$ gas pressure of more than 5 atm is desirable. $N_2$ gas has less tendency to generate plasma than He or Ar. Therefore filling the chamber 102B with $N_2$ at high pressure can make it difficult for dielectric breakdown to occur.

Figure 15:
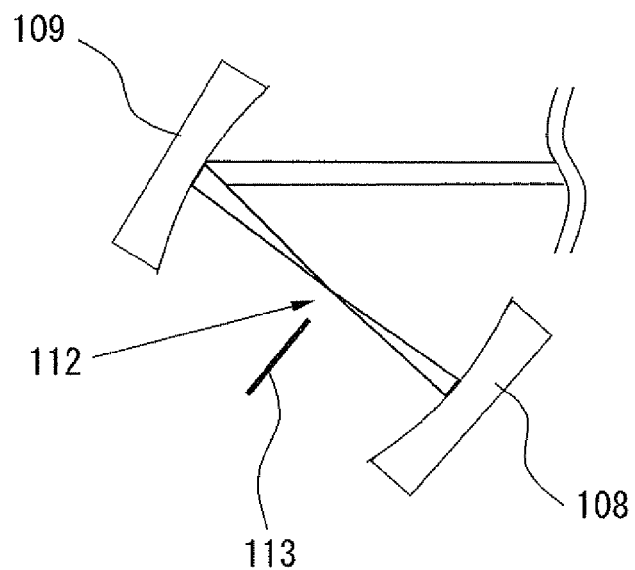
FIG. 15 is a supplemental diagram for explaining an alignment of an optical axis and a laser operation in the oxygen laser oscillator 100.

The optical alignment procedure and the lasing of the oxygen laser oscillator 100 according to the first embodiment are explained with reference to FIGS. 15 to 17. As illustrated in FIG. 15, during the optical alignment with the He—Ne laser, the shutter 113 is pulled out from the focused point 112. Accordingly, the laser beam LB from the He—Ne laser can travel back and forth in the laser cavity 115. Therefore optical alignment of the laser cavity can be performed.

Figure 16:
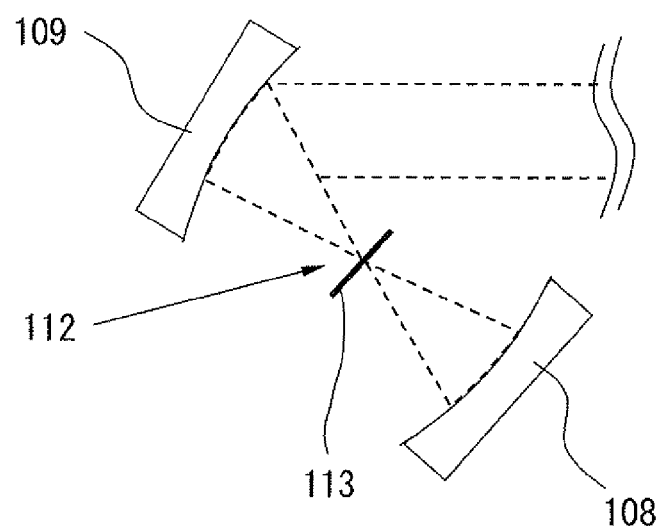
FIG. 16 is a supplemental diagram for explaining an alignment of an optical axis and a laser operation in the oxygen laser oscillator 100.
Figure 17:
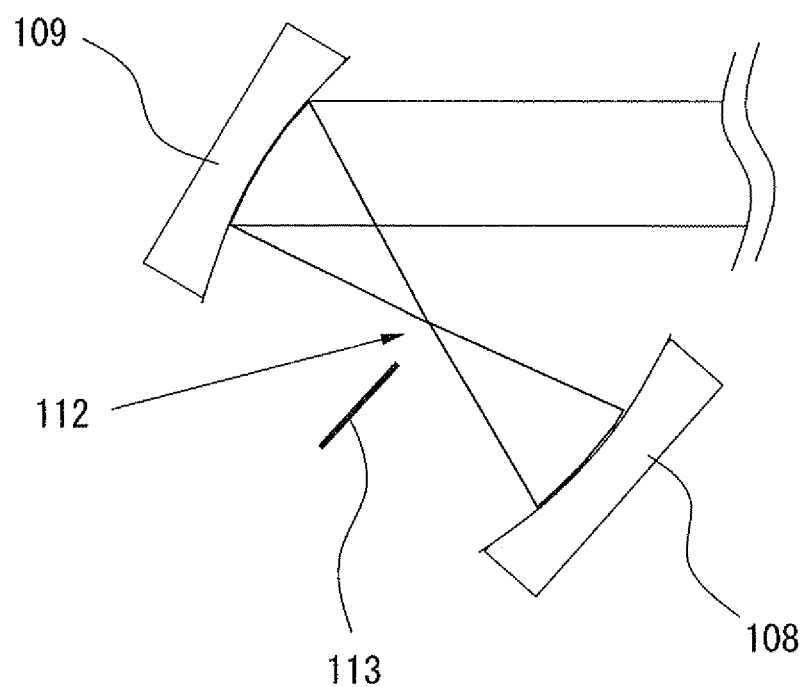
FIG. 17 is a supplemental diagram for explaining an alignment of an optical axis and a laser operation in the oxygen laser oscillator 100.

As illustrated in FIG. 16, when the chamber 102A is filled with the exited oxygen molecules, the shutter 113 is pulled into the focused point 112. Therefore the lasing is set to OFF so that the laser beam cannot travel back and forth in the laser cavity. Then, as illustrated in FIG. 17, in order to start lasing, the shutter 113 is pulled out from the focused point 112 and the lasing is set to ON. Therefore, a spontaneous emission generated in the laser cavity 115 is enhanced by traveling back and forth in the laser cavity. This makes the lasing start.

Figure 18:
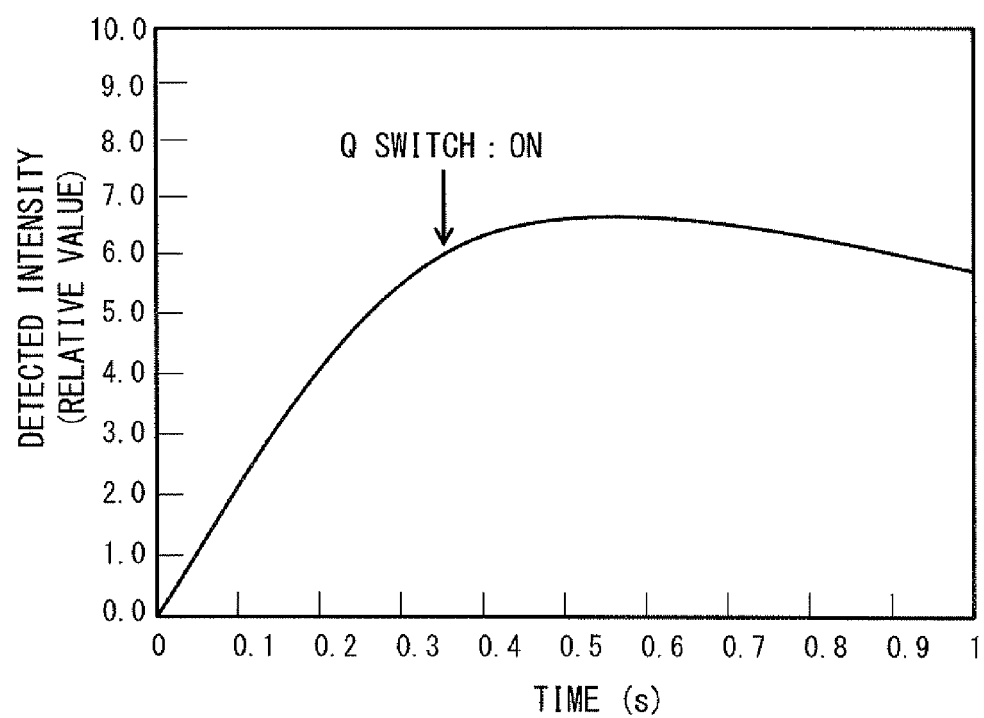
FIG. 18 shows an example of time variation of a light intensity of a spontaneous emission from an excited oxygen molecule detected by a photo detector 114.

As described above, the He—Ne laser which has a wavelength different from that of the oxygen laser is used for the optical alignment. However reflecting directions do not depend on the wavelength because all of the output mirror 107, the convex mirror 108, and the parabolic mirror 109 which constitute the laser cavity of the oxygen laser oscillator 100 are reflectors. Accordingly, even if the He—Ne laser having a wavelength of 633 nm is used, it is possible to perform precise optical alignment of the laser cavity of the oxygen laser oscillator 100 for the lasing at 1.27 μm The following explains the timing of the shutter 113. The oxygen laser oscillator 100 employs a photo detector 114 at the chamber 102A. The photo detector 114 can detect the spontaneous emission generated from $O_2(^1\Delta_g)$ which the chamber 102A is filled with. The shutter timing can be decided based on information about a light intensity of the spontaneous emission. FIG. 18 illustrates a graph showing a relative light intensity received by the photo detector 114 against time after a start of $O_2(^1\Delta_g)$ generation by oxygen generator 105. A horizontal axis is an example. The plotted curve depends on the singlet oxygen generation rate by the singlet oxygen generator 105 and/or the volume of the chamber 102A.

As shown in FIG. 18, the detected intensity signal increases linearly just after the start of the $O_2(^1\Delta_g)$ generation. But after storing $O_2(^1\Delta_g)$ up to some pressure, $O_2(^1\Delta_g)$ start to decrease by coalitional deactivation. Therefore, in this embodiment, the shutter 113 is ON a little before the maximum intensity of the spontaneous emission from $O_2(^1\Delta_g)$ is detected. This enables the maximum pulsed energy to be extracted.

Although the shutter 113 is ON at the time of the maximum intensity of the spontaneous emission from $O_2(^1\Delta_g)$, the shutter (113) may instead be ON when the slope of the curve decreases down to some level. Generally, the shutter 113 may be controlled by a signal from the photo detector 114.

Second Embodiment

Figure 2:
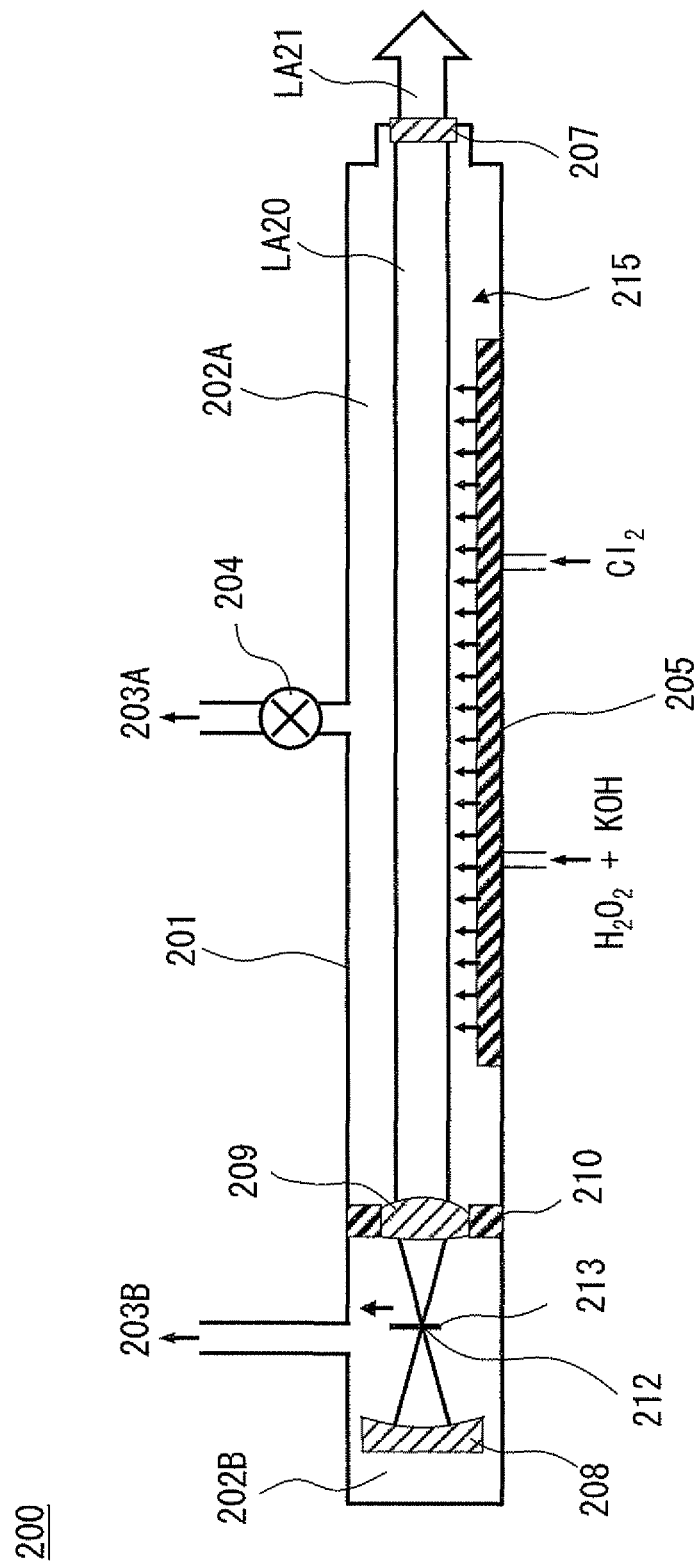
FIG. 2 is a cross sectional drawing of an oxygen laser oscillator 200 according to another embodiment of the invention.

A second embodiment according to the present invention will be described with reference to FIG. 2. FIG. 2 is a cross sectional drawing of an oxygen laser oscillator 200. An explanation of contents similar to those of the first embodiment will be omitted. A configuration of the oxygen laser oscillator 200 different from the oxygen laser oscillator 100 shown in FIG. 1 is a way of forming the focused point 212. An aspherical convex lens 209 is employed as the focusing optics in a laser cavity 215 which consists of an output mirror 207 and a convex mirror 208. The aspherical convex lens 209 makes the focused point 212. A shutter 213 can be pulled into the focused point 212. The aspherical convex lens 209 is attached inside of a housing 201 by a holder 210.

The holder 210 can be plugged in a gap between the aspherical convex lens 209 and housing 201. The holder 210 spatially separates a chamber 202A from a chamber 202B. Therefore, only the chamber 202B can be kept in a vacuum, which can prevent plasma being made at the focused point 212.

The chamber 202A is pumped out by a vacuum pump 203A through a valve 204. The chamber 202B is pumped out by a vacuum pump 203B. A singlet oxygen generator 205 can fill the chamber 202A with $O_2(^1\Delta_g)$, which is analogous to what the singlet oxygen generator 105 does. A laser light LA20 internally generated can go back and forth inside the laser cavity 215. As a result, a simulated emission occurs and light is amplified in the laser cavity. Laser oscillates and a laser light LA21 can be extracted from the output mirror 207.

A reason for not employing a spherical lens and instead employing the aspherical convex lens 209 is to obtain a small aberration. Therefore the laser can be tightly focused at the focused point 212. Especially, large diameter of the laser beam increases the aberration if a convex spherical lens is used. Utilizing the aspherical convex lens 209 can reduce the aberration even though the beam diameter is large, which enables tight focusing.

Additionally the aspherical convex lens 209 in this embodiment employs an achromatic lens at two wavelengths of 633 nm and 1.27 µm. The aspherical convex lens 209 has substantially the same focal length for the He—Ne laser having a wavelength of 633 nm for the optical alignment and the laser having the wavelength of 1.27 µm for the lasing. Therefore, once the optical alignment is achieved by the He—Ne laser having a wavelength of 633 nm, the optical alignment is automatically achieved by the laser having the wavelength of 1.27 µm also.

However, if non-achromatic convex lens is used instead, the convex rear mirror 208 needs to be shifted after the optical alignment by the He—Ne laser in order to resonant the 1.27 µm laser. An amount of the adjustment (a shift length) can be estimated by an optical simulation beforehand.

Instead of using the He—Ne laser for the optical alignment, an infrared semiconductor laser which oscillates at a wavelength near 1.27 µm such as 1.3 µm may be used. In this case, an achromatic lens is not necessary. However, since 1.27 µm is not a visible wavelength, the optical alignment is difficult.

Third Embodiment

Figure 3:
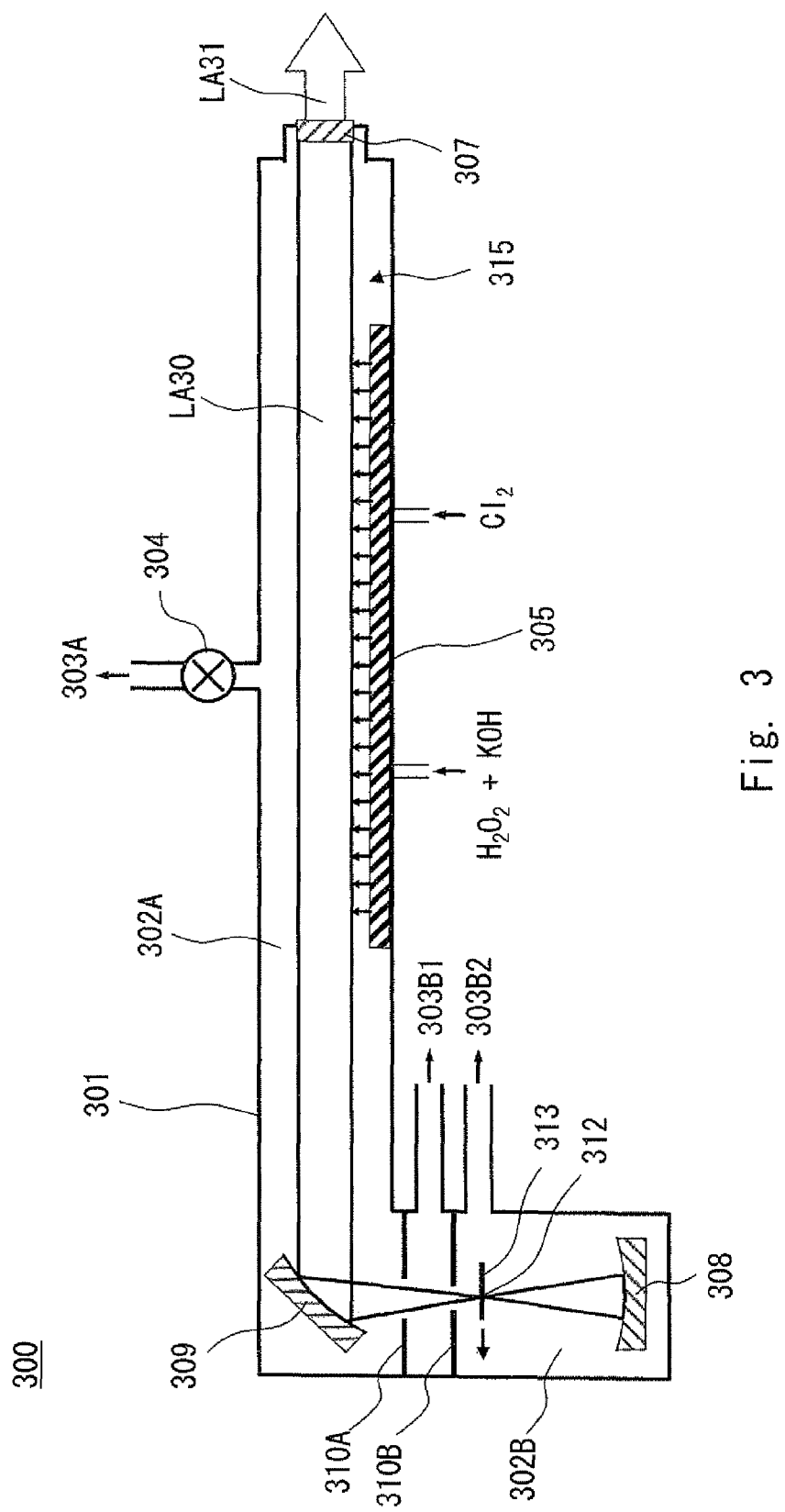
FIG. 3 is a cross sectional drawing of an oxygen laser oscillator 300 according to another embodiment of the invention.

A third embodiment according to the present invention will be described with reference to FIG. 3. FIG. 3 is a cross sectional drawing of an oxygen laser oscillator 300. An explanation of contents similar to those of the first embodiment will be omitted. Configurations different from those of the first embodiment are configurations of a chamber 302A and a chamber 302B and a configuration of vacuum evacuation. The housing 301 has two pinhole plates 310A and 310B. Similar to the first embodiment, a laser cavity 315 is formed with an output mirror 307 and a convex mirror 30.

In this embodiment, the two pinhole plates 310A and 310B are placed between the chamber 302A and the chamber 302B, and a laser beam goes through holes of the two pinhole plates 310A and 310B. The chamber 302A is pumped out by a vacuum pump 303A through a valve 304. The chamber 302B is pumped out by a vacuum pump 303B2. Similar to the oxygen generator 105, the singlet oxygen generator 305 can fill the chamber 302a with $O_2(^1\Delta_g)$. The small area between the two pinhole plates 310A and 310B is also pumped out by a vacuum pump 303B1. Therefore, these pinhole plates 310A and 310B are used to make a differential pumping, which can keep a high vacuum in the chamber 302B. Consequently the focused point 213 is kept in a high vacuum, which can suppress generating of plasma even if the laser beam is focused at the focused point 321. A shutter 313 can be pulled into a focused point 312.

A laser light LA30 internally generated can go back and forth inside the laser cavity 315. As a result, a simulated emission occurs and a light is amplified in the laser cavity. Laser oscillation occurs and a laser light LA31 can be extracted from the output mirror 307.

As described above, the oxygen laser oscillator 300 employs the differential pumping to keep a high vacuum around the focused point 312 which is formed by a parabolic mirror 309 and a concave mirror 308. Therefore, a window or the like is not necessary, which reduces optical loss in the laser cavity and obtains an efficient laser oscillation.

Fourth Embodiment

Figure 4:
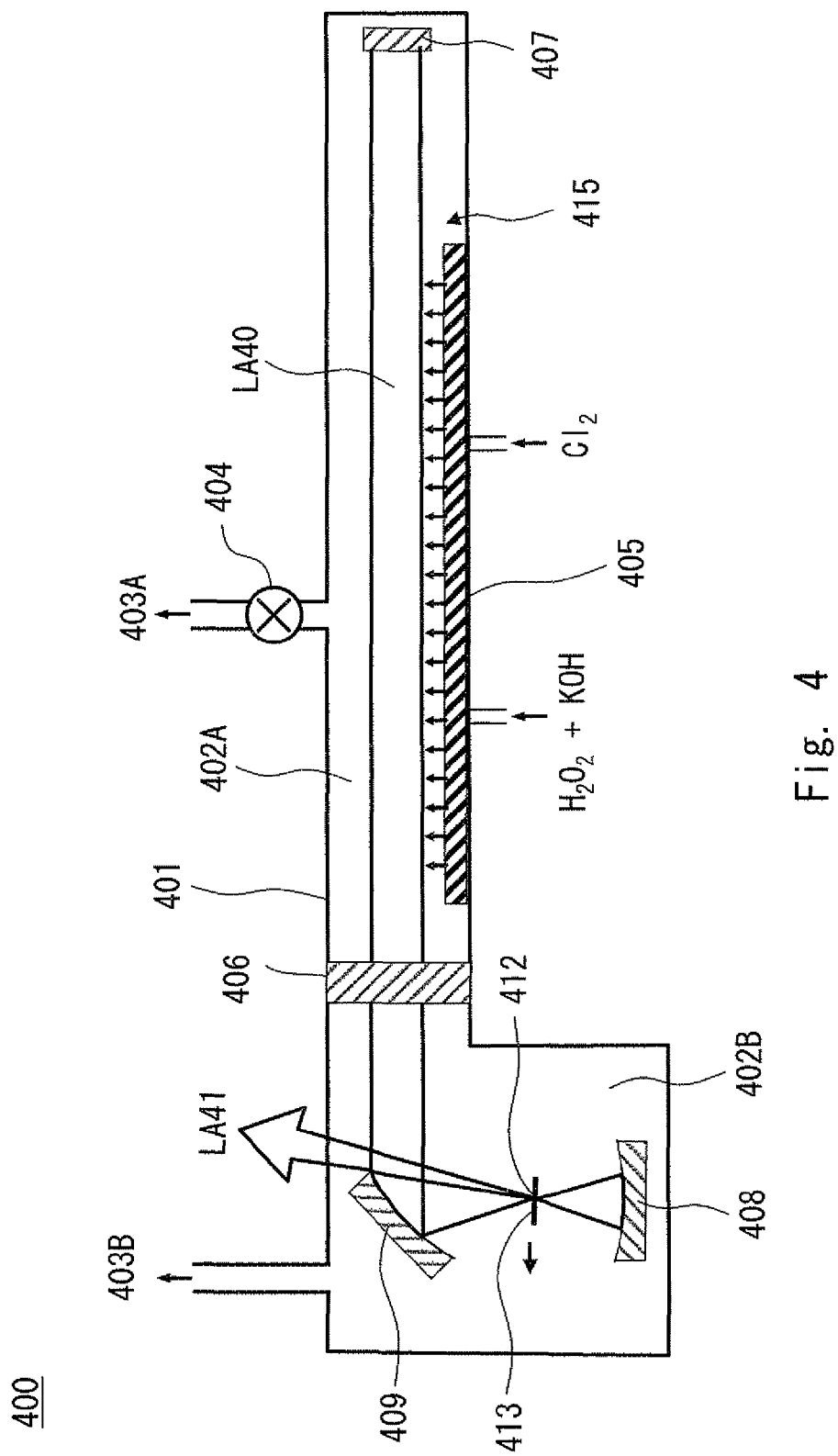
FIG. 4 is a cross sectional drawing of an oxygen laser oscillator 400 according to another embodiment of the invention.

A fourth embodiment according to the present invention will be described with reference to FIG. 4. FIG. 4 is a cross sectional drawing of an oxygen laser oscillator 400. An explanation of contents similar to those of the first embodiment will be omitted. The oxygen laser oscillator 400 is characterized in that a laser cavity 415 is formed with an unstable laser cavity. The unstable laser cavity has three total reflectors. The three total reflectors are a flat mirror 407, concave mirror 408, and a parabolic mirror 409 which is a focusing optics of a component of the present invention. Moreover, the housing 401 is separated into a chamber 402A and a chamber 402B.

Therefore, similar to the window 106, a window 406 seals the chamber 402A and the chamber 402B. The chamber 402A is pumped out by a vacuum pump 403A through a valve 404. The chamber 402B is pumped out by a vacuum pump 403B. Similar to the singlet oxygen generator 105, a singlet oxygen generator 405 placed in the chamber 402A generates excited oxygen molecules.

A shutter 413 can be pulled into a focused point 412. When a Q switch is made ON by the shutter 413 in the oxygen laser oscillator 400, a laser light LA40 is generated inside the laser cavity 415. A part of the laser light LA40 exits from the parabolic mirror 409, and laser light LA41 is extracted from the laser cavity 415. As described above, since the oxygen laser oscillator 400 has the unstable cavity, the oxygen laser oscillator 400 has the ability of the tunable transmission rate by tilting the concave mirror 408.

Fifth Embodiment

Figure 5:
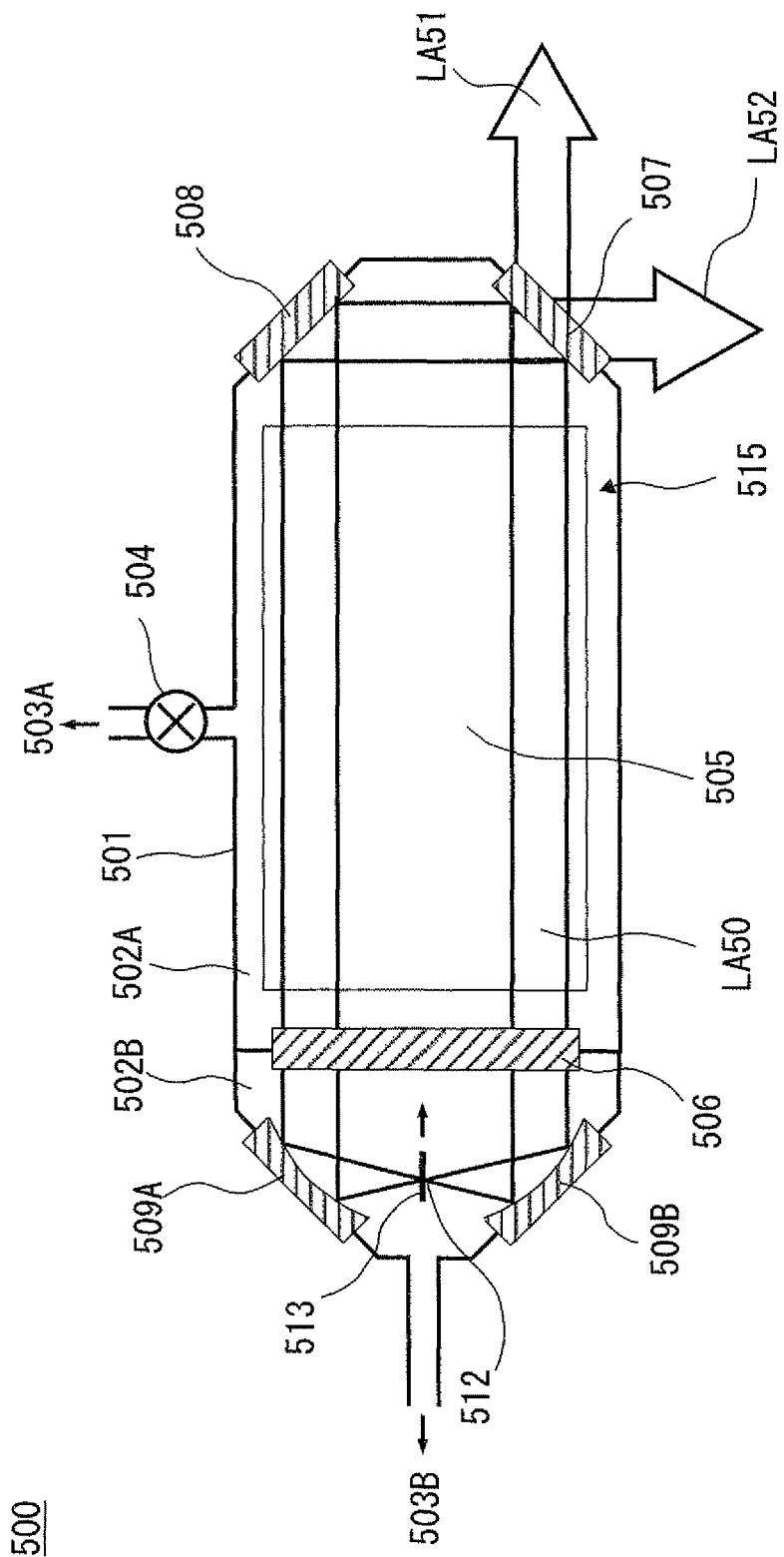
FIG. 5 is a cross sectional drawing of an oxygen laser oscillator 500 according to another embodiment of the invention.
Figure 6:
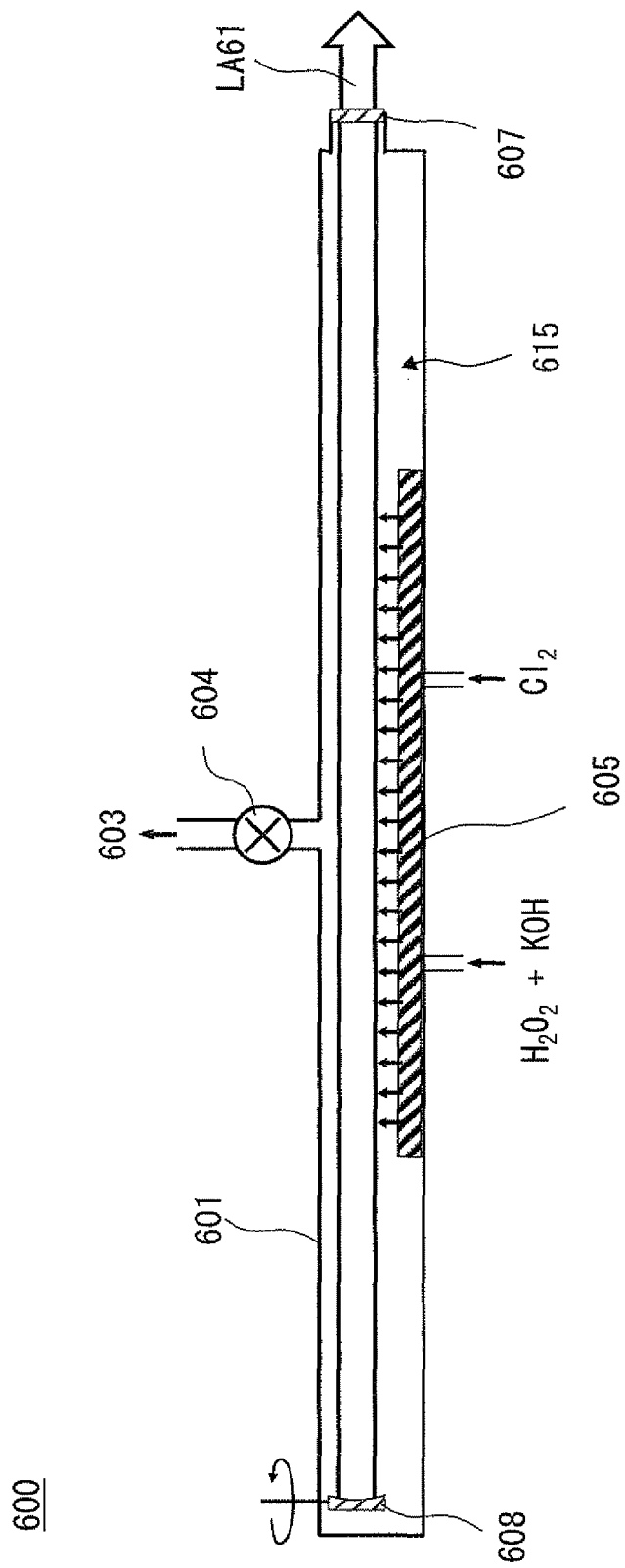
FIG. 6 is a cross sectional drawing of an oxygen laser oscillator 600 used as a simulation model.
Figure 7:
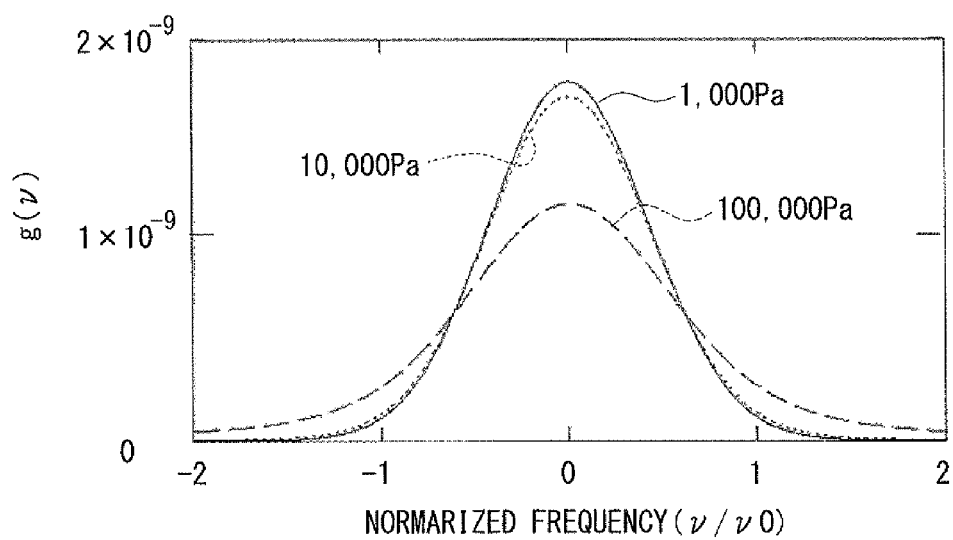
FIG. 7 shows a calculated result of a spectral profile g(v)
Figure 8:
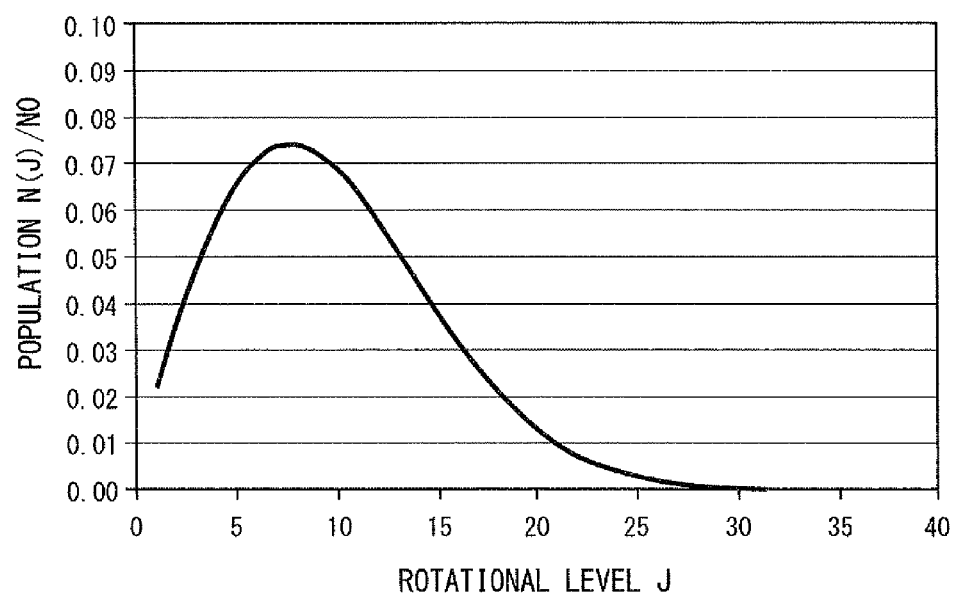
FIG. 8 shows a calculated result of a relative population of a population density under consideration for a rotational level.
Figure 9:
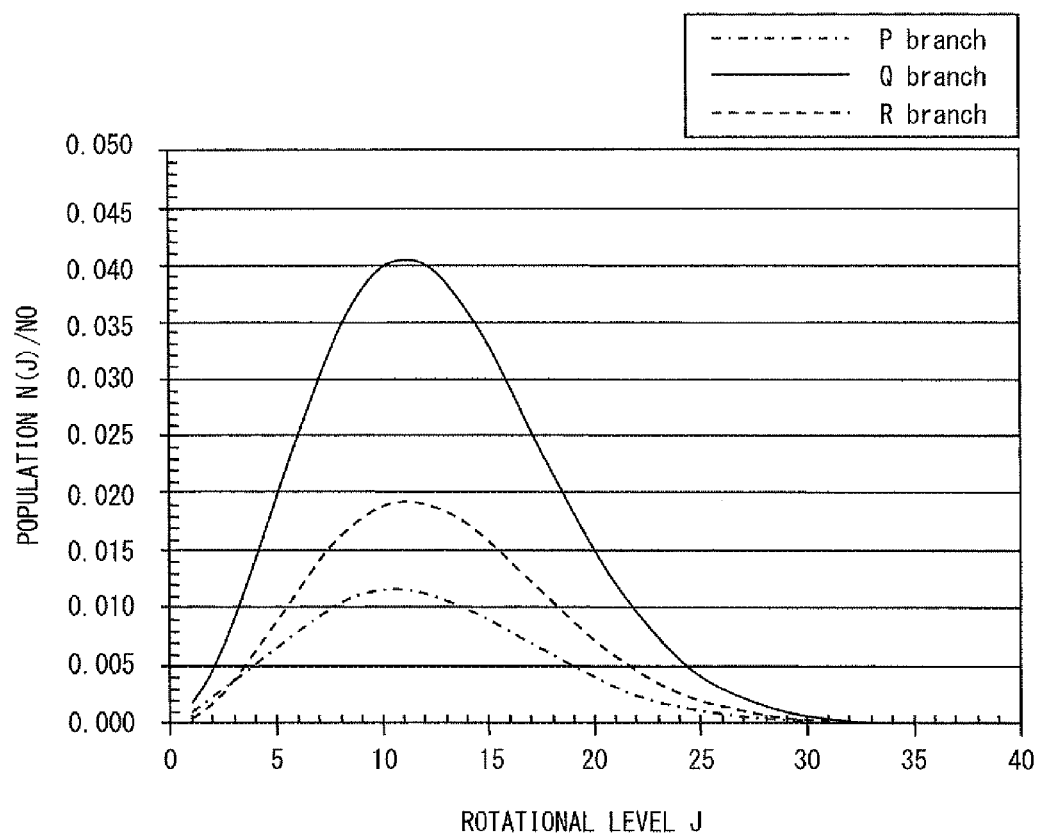
FIG. 9 shows a calculated result of the relative population of the population density of the rotational level under consideration for each branch.
Figures 11, 12:
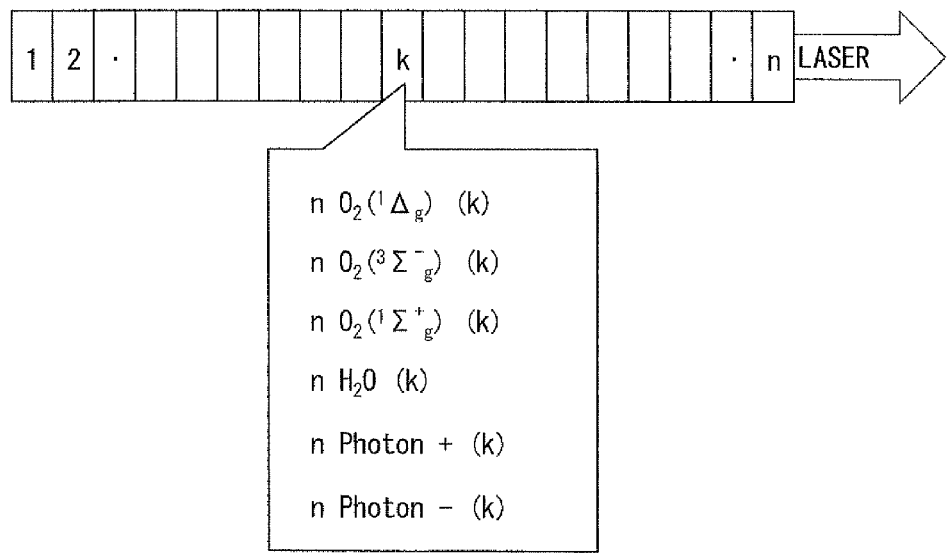
FIG. 11 shows a divided model in a laser oscillator for a simulation.
FIG. 12 is a table 2 showing simulation conditions.
Figure 13:
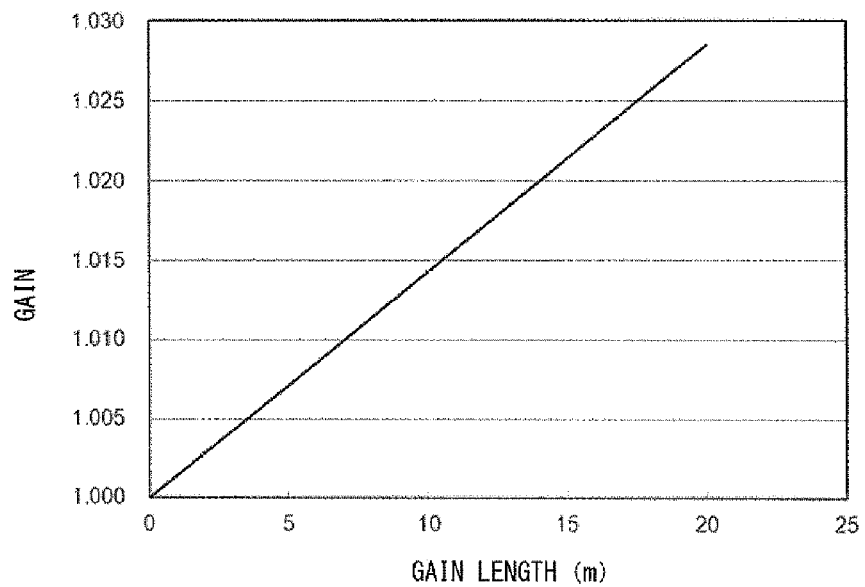
FIG. 13 shows a simulation result of the Oxygen laser amplifier.
Figure 14:
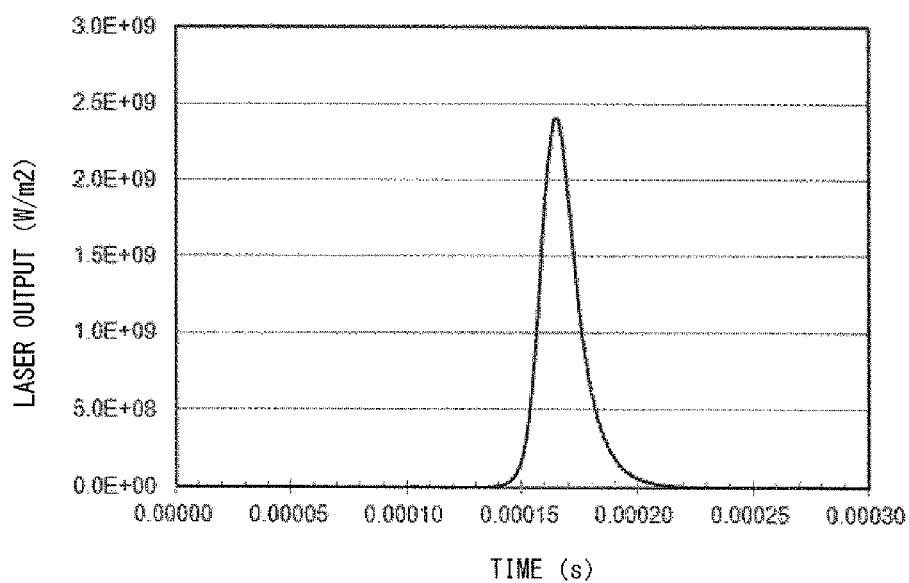
FIG. 14 shows a simulation result showing a peak power of a laser light against time.

A fifth embodiment according to the present invention will be described with reference to FIG. 5. FIG. 5 is a cross sectional drawing of an oxygen laser oscillator 500. An explanation of contents similar to those of the first embodiment will be omitted. A ring laser cavity 515 is used for the oxygen generator 500. That is, the laser cavity 515 is formed with four mirrors of an output mirror 507, a total reflector 508, and two parabolic mirrors 509A and 509B. Laser beam LA50 internally generated travels and circulates via these four mirrors.

Oscillated laser LA50 goes through a window 506 which is attached between a chamber 502A and a chamber 502B. A housing 501 is separated into the chamber 501A and the chamber 502B. The chamber 502A is pumped out by a vacuum pump 503A through a valve 504. The chamber 502a is filled with excited oxygen molecules generated by a singlet oxygen generator 505. The chamber 502B is kept in a vacuum by a vacuum pump 503B. Since the drawing is a top view, $H_2O_2$, KOH and $Cl_2$ are not shown in the singlet oxygen generator 505.

A shutter 513 is movably placed at the focused point 512. When the shutter is made ON, laser LA50 oscillates, and is extracted to the outside of the laser cavity 515 from the output mirror 507. Since the laser LA50 has two directions opposite to each other, one is extracted as laser LA51 from the output mirror 507, and the other is extracted as laser LA52 from the output mirror 507. The transmission rate of the output mirror 507 is set to be around 1%.

The advantage of employing the ring laser cavity is that there is no standing wave because a resonant does not occur and the laser beam is formed so that light circulates many times via mirrors. Consequently, the laser oscillates at a single frequency that is the easiest to oscillate since the oscillation has no multi-longitudinal modes.

According to the present invention, an oxygen laser oscillator can be realized and a pulsed laser can be produced. Especially, since scale up is easy, an extremely large energy pulsed laser can be produced by employing a large volume chamber which can store a high volume of single oxygen molecules. Therefore, the present invention is suitable for a driver of inertial confinement fusion which needs an extremely large energy pulsed laser or a device for destroying a dangerous flying object.

The photo detector 114 can be used for the second to fifth embodiments, an operation timing of the shutter 113 may be controlled based on information about an intensity of the spontaneous emission detected by the photo detector 114. At least two embodiments among the first to fifth embodiments can be combined as desirable by one of ordinary skill in art.

While the invention has been particularly shown and described with reference to exemplary embodiments thereof, the invention includes various changes which do not negatively affect the purpose and benefits of the invention and is not limited to these exemplary embodiments.

REFERENCE SIGNS LIST

100 OXYGEN LASER OSCILLATOR
101 HOUSING
102A, 102B CHAMBERS
103A, 103B VACUUM PUMPS
104 VALVE
105 EXCITED OXYGEN GENERATOR
106 WINDOW
107 OUTPUT MIRROR
108 CONCAVE MIRROR
109 PARABOLIC MIRROR
110 PINHOLE PLATE
111 DICHROIC MIRROR
112 FOCUSED POINT
113 SHUTTER
114 PHOTO DETECTOR
115 LASER CAVITY
200 OXYGEN LASER OSCILLATOR
201 HOUSING
202A, 202B CHAMBERS
203A, 203B VACUUM PUMPS
204 VALVE
205 EXCITED OXYGEN GENERATOR
207 OUTPUT MIRROR
208 CONCAVE MIRROR
209 ASPHERICAL CONVEX LENS
210 HOLDER
212 FOCUSED POINT
213 SHUTTER
215 LASER CAVITY
300 OXYGEN LASER OSCILLATOR
301 HOUSING
302A, 302B CHAMBERS
303A, 303B1, 303B2 VACUUM PUMPS
304 VALVE
305 EXCITED OXYGEN GENERATOR
306 WINDOW
307 OUTPUT MIRROR
308 CONCAVE MIRROR
309 PARABOLIC MIRROR
310A, 310B PINHOLE PLATES
311 DICHROIC MIRROR
312 FOCUSED POINT
313 SHUTTER
315 LASER CAVITY
400 OXYGEN LASER OSCILLATOR
401 HOUSING
402A, 102B CHAMBERS
403A, 103B VACUUM PUMPS
404 VALVE
405 EXCITED OXYGEN GENERATOR
407 OUTPUT MIRROR
408 CONCAVE MIRROR
409 PARABOLIC MIRROR
412 FOCUSED POINT
413 SHUTTER
515 LASER CAVITY
500 OXYGEN LASER OSCILLATOR
501 HOUSING
502A, 502B CHAMBERS
503A, 503B VACUUM PUMPS
504 VALVE
505 EXCITED OXYGEN GENERATOR
506 WINDOW
507 OUTPUT MIRROR
508 TOTAL REFRECTOR
509A. 509B PARABOLIC MIRRORS
513 SHUTTER
600 OXYGEN LASER OSCILLATOR
601 HOUSING
603 VACUUM PUMP
605 EXCITED OXYGEN GENERATOR
607 OUTPUT MIRROR
608 TOTAL REFRECTOR
615 LASER CAVITY
LA10, LA11, LA12, LA21, LA30, LA31, LA40, LA41, LA50, LA51, LA52, LA61, LASER LIGHTS
LB LASER LIGHT OF He—Ne LASER

The invention claimed is:
1. An oxygen laser oscillator comprising:
a laser cavity having at least two reflecting mirrors;
an area capable of filling the laser cavity with excited oxygen molecules;
a focusing optics placed in the laser cavity; and,
a shutter controlling whether laser light passes through or is blocked at a focused point formed by the focusing optics in the laser cavity.
2. The oxygen laser oscillator according to claim 1, wherein the shutter is moved by a spring force.
3. The oxygen laser oscillator according to claim 1, wherein the laser cavity has a total reflector and a partial transmission mirror, and
wherein the partial transmission mirror partially transmits a light with 1.27 µm.
4. The oxygen laser oscillator according to claim 3, wherein the total reflector is a convex mirror and the focusing optics is a parabolic mirror.
5. The oxygen laser oscillator according to claim 3, wherein the total reflector is a convex mirror and the focusing optics is an achromatic lens.
6. The oxygen laser oscillator according to claim 1, further comprising a structure capable of evacuating a vicinity of the focused point.
7. The oxygen laser oscillator according to claim 6, wherein the structure capable of evacuating the vicinity area of the focused point by differential pumping.
8. The oxygen laser oscillator according to claim 1, wherein a vicinity of the focused point is filled with insulating gas.

9. The oxygen laser oscillator according to claim 8, wherein the insulating gas is $SF_6$ or $N_2$.

10. The oxygen laser oscillator according to claim 1, wherein a movement of the shutter is started based on information about a light intensity of a spontaneous emission from the excited oxygen in the laser cavity.

\* \* \* \* \*